United States Patent [19]

Baney et al.

[11] E Re. 31,447

[45] Reissued Nov. 22, 1983

[54] HIGH YIELD SILICON CARBIDE PRE-CERAMIC POLYMERS

[75] Inventors: Ronald H. Baney; John H. Gaul, Jr., both of Midland, Mich.

[73] Assignee: Dow Corning Corporation, Midland, Mich.

[21] Appl. No.: 369,336

[22] Filed: Apr. 16, 1982

Related U.S. Patent Documents

Reissue of:

[64] Patent No.: 4,298,558
Issued: Nov. 3, 1981
Appl. No.: 171,553
Filed: Jul. 23, 1980

[51] Int. Cl.[3] ..... F27B 9/04

[52] U.S. Cl. ..... 264/65; 423/344; 423/345; 528/12; 528/13; 528/18; 528/29; 427/350; 427/387; 428/446; 428/429; 428/467; 556/430; 556/431; 556/480; 501/88

[58] Field of Search ..... 264/65; 106/44; 423/344, 345; 528/29, 12, 18, 13; 427/350, 387; 428/446, 467, 429; 556/480, 430, 431

[56] References Cited

U.S. PATENT DOCUMENTS

| | | | |
|---|---|---|---|
| 2,923,633 | 2/1960 | Stedman | 106/13 |
| 3,853,567 | 12/1974 | Verbeek | 106/44 |
| 4,052,430 | 10/1977 | Yajima et al. | 556/431 |
| 4,105,455 | 8/1978 | Koga et al. | 106/44 |

*Primary Examiner*—Melvyn I. Marquis
*Attorney, Agent, or Firm*—Robert L. McKellar

[57] ABSTRACT

Pre-polymers which are alkoxylated or phenoxylated methylpolysilanes are useful for the preparation of fine grained silicon carbide ceramic materials and silicon carbide-containing ceramics. The pre-polymers exhibit ease of handling and their use to obtain silicon carbide ceramic materials results in high yields.

16 Claims, No Drawings

HIGH YIELD SILICON CARBIDE PRE-CERAMIC POLYMERS

Matter enclosed in heavy brackets [ ] appears in the original patent but forms no part of this reissue specification; matter printed in italics indicates the additions made by reissue.

BACKGROUND OF THE INVENTION

The concept of preparing silicon carbide ceramic materials or filled ceramics from silicon carbide ceramic materials is not new. As applied to the preparation of silicon carbide-containing ceramics from the degradation of polymers, any number of published articles or issued patents have appeared.

Yajima in U.S. Pat. No. 4,052,430, issued Oct. 4, 1977, has described the preparation of polycarbosilanes prepared by pyrolyzing the polysilanes generated by the reaction of sodium or lithium metal with dimethyldichlorosilane. These polycarbosilanes can be heated to yield beta-silicon carbide.

West and Maszdiazni reported in the 22nd AFOSR Chemistry Program Review FY77, R. W. Heffner ed. March (1978), that a polymer, made by reacting dimethyldichlorosilane with methylphenyldichlorosilane and an alkali metal, could be fired at high temperatures to yield whiskers of beta-silicon carbide.

Verbeek has shown in U.S. Pat. No. 3,853,567, the preparation of a mixed ceramic of silicon carbide and silicon nitride by pyrolyzing a polysilazane. In addition, Verbeek has prepared a polycarbosilane suitable for molding by heating organosilicon polymers optionally mixed with silicon dioxide or organic polymers at a temperature between 400° and 1200° C.

Rice et al., in U.S. Pat. No. 4,097,794 issued June 27, 1978, have suggested that almost anything containing silicon can be pyrolyzed to give a ceramic material.

Baney, in U.S. patent application Ser. No. 910,247, filed May 30, 1978, now abandoned, and continued as a continuation-in-part, Ser. No. 024,137, filed Mar. 26, 1979, now abandoned and continued as a continuation-in-part of Ser. No. 135,567, filed Mar. 31, 1980 disclosed a methylhalopolysilane which can be fired at 1200° C. or higher to yield fine grain beta-silicon carbide. The yields and handling characteristics of these latter polysilanes were enhanced over the prior materials.

Finally, mention should be made of recent Japanese patent publications 80500/78 and 101099/78 in the name of Takamizawa et al. These publications deal with polymers made from methylchlorodisilanes but no mention is made of the yields of ceramic material generated by the decomposition of the disilane. Recent publications by Nakamura (Japanese Kokais 79/114600 and 79/83098 suggest that the preparation of silicon carbide precursor polymers having a silicon-carbon (—Si—C—Si) backbone are prepared by heating organosilicon compounds (including $(CH_3)_3SiSi(CH_3)_2Cl$) in the presence of B, Al, Si, Ge, Sn and Pb compounds or HI and its salts, at high temperatures.

It has now been determined that high yields of silicon carbide ceramic materials and filled ceramics can be obtained from the methods and the new materials of the instant invention.

THE INVENTION

This invention deals with a process for obtaining new and novel polysilanes which process consists of a method of preparing a polysilane having the average formula $$\{(CH_3)_2Si\}\{CH_3Si\} \quad (I)$$

in which polysilane there is from 0 to 60 mole percent $(CH_3)_2Si{=}$ units and 40 to 100 mole percent $CH_3Si{\equiv}$ units, wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 25 weight percent chlorine or 0–35 weight percent bromine, all based on the weight of the polysilane which method consists of (A) reacting under anhydrous conditions a polysilane having the average unit formula $$\{(CH_3)_2Si\}\{CH_3Si\} \quad (II)$$

in which there is from 0 to 60 mole percent $(CH_3)_2Si{=}$ units and 40 to 100 mole percent $CH_3Si{\equiv}$ units, wherein the remaining bonds on the silicon atoms are attached to either another silicon atom, a chlorine atom or a bromine atom such that the polysilane contains from 10–43 weight percent, based on the weight of the polysilane, of hydrolyzable chlorine or 21–62 weight percent based on the weight of the polysilane of hydrolyzable bromine, with a reagent selected from the group consisting of (i) carbinols having the general formula ROH (ii) alcoholates having the general formula ROM and (iii) alkyl orthoformates having the general formula $(R'O)_3CH$ wherein R is the same as above and R' is an alkyl group of 1–4 carbon atoms, and M is sodium, potassium or lithium, at a temperature of from 0° to 100° C. for a period of from 1.5 to 65 hours, in a suitable solvent, and (B) thereafter recovering the polysilane (I).

This invention also deals with a composition of matter which is a polysilane having the average formula $$\{(CH_3)_2Si\}\{CH_3Si\}$$

in which polysilane there is from 0 to 60 mole percent $(CH_3)_2Si{=}$ units and 40 to 100 mole percent $CH_3Si{\equiv}$ units wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane.

Further, this invention deals with shaped articles made from the polysilanes, with, or without fillers, and a method by which the shaped articles are obtained.

This invention also consists of a method of preparing silicon carbide ceramic materials which consists of heating a polysilane having the average unit formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 25 weight percent chlorine or 0–35 weight percent bromine, all based on the weight of the polysilane.

The inventions described herein represent an improvement over the art, in that, higher yields of silicon carbide ceramic materials are obtained upon pyrolysis of the polysilanes and the polysilanes herein are much easier and safer to handle because the replacement of the halogen substituents with —OR radicals limits hydrolysis to a certain extent and thus reduces the quantity of corrosive HCl or HBr gas liberated.

This invention results from replacing halogen atoms on the above described polyhalosilanes with alkoxy or phenoxy radicals, the resulting product, upon pyrolysis, gives silicon carbide ceramic materials.

The polychlorosilane starting materials are those set forth and described in the Baney patent application Ser. No. 910,247, filed May 30, 1978, now abandoned, and continued as a continuation-in-part, Ser. No. 024,137, filed Mar. 26, 1979, now abandoned and continued as a continuation-in-part as Ser. No. 135,567, filed Mar. 31, 1980, which are hereby incorporated by reference.

The starting materials are those described in the Baney application which consist of 10–43 weight percent, based on the weight of the polysilane, of hydrolyzable chlorine or 21–62 weight percent, based on the weight of the polysilane, of hydrolyzable bromine.

These polyhalosilane starting materials can be prepared by treating methylhalodisilanes with catalysts such as $(C_4H_9)_4P+Cl-$ or, they can be prepared by treating halosilane residue which is derived from the Direct Synthesis of halosilanes. The aforementioned disilane is found in large quantities in the residue (See Eaborn, "Organosilicon Compounds", Butterworths Scientific Publications, 1960, page 1).

The polyhalosilane starting materials are then subjected to a treatment with an alkoxylating reagent in an anhydrous environment to obtain the inventive polysilane.

Generally, the process consists of placing a dry solvent solution of the starting polyhalosilane in a suitably equipped reaction vessel and thereafter adding the reagent directly into the reaction vessel as a liquid. After the initial reaction has taken place, the reaction mass is stirred and sometimes heated to ensure complete reaction. It is then cooled and filtered. The resulting products are either solids or liquids depending on the starting materials.

These materials are then shaped (if desired), filled with ceramic type fillers (if desired) and fired to temperatures of 1200° C. or higher in vacuo or in an inert atmosphere to obtain silicon carbide ceramic materials or silicon carbide material-containing ceramic articles.

Thus, this invention contemplates the preparation of a filled ceramic article prepared from the silicon carbide ceramic materials of this invention. The method consists of (A) mixing a polysilane with at least one conventional ceramic filler which polysilane has the average formula $$\{(CH_3)_2Si\}\{(CH_3Si\}$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane, (B) forming an article of the desired shape from the mixture of polysilane and fillers and, (C) heating the article formed in (B) in an inert atmosphere or in a vacuum to an elevated temperature in the range of 1200° C. to 1600° C. until the polysilane is converted to a silicon carbide-containing ceramic.

It is also contemplated within the scope of this invention to prepare articles which are coated with the silicon carbide ceramic materials of this invention which are then pyrolyzed to give articles coated with silicon carbide-containing ceramics. Thus, the method of preparing such an article coated with ceramic consists of (A) mixing a polysilane with at least one conventional ceramic filler which polysilane has the average unit formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 25 weight percent chlorine or 0–35 weight percent bromine, all based on the weight of the polysilane; (B) coating a substrate with the mixture of polysilane and fillers and, (C) heating the coated substrate in an inert atmosphere or in a vacuum to an elevated temperature in the range of 1200° C. to 1600° C. until the coating is converted to a silicon carbide ceramic, whereby a silicon carbide-containing ceramic coated article is obtained.

The treating reagents useful in this invention are of three different types; namely, carbinols having the general formula ROH; alcoholates having the general formula ROM and alkyl orthoformates having the general formula $(R'O)_3CH$ in which R is an alkyl group of 1-4 carbon atoms and phenyl, R' is an alkyl group of 1-4 carbon atoms and M is sodium, potassium or lithium. Specific examples of materials useful in this invention are $CH_3OH$, $CH_3CH_2OH$, $CH_3(CH_2)_3OH$, $NaOCH_3$, $KOCH_3$, $LiOCH_2CH_3$, $(CH_3O)_3CH$, $(CH_3CH_2O)_3CH$ and phenol. Preferred for this invention are the alkyl orthoformates and alcoholates. Most preferred is $NaOCH_3$.

Generally, the reagent is used in a stoichiometric excess based on the amount of halogen present in the polysilane (II) to ensure that the alcoholysis reaction is enhanced. Excess reagent as well as any solvents and byproducts can be stripped or strip distilled at the end of the reaction.

It is contemplated within the scope of this invention to use a combination of reagents so as to vary the carbon content as desired.

For best results, dry reaction conditions should be observed.

Solvents for the starting polyhalosilanes can be any organic solvent in which the material is soluble and which does not react with the material except in the desired manner. Examples of useful solvents include toluene, xylene, benzene, tetrahydrofuran and ethers. Specifically, toluene is preferred.

Generally, the order of addition of the components is not critical, but it has been found preferable to add the neat reagent to the polyhalosilane in a solvent solution, such as toluene. This addition and reaction is carried out while the materials are stirred or otherwise agitated.

The reaction is carried out in a dry inert atmosphere such as in the presence of nitrogen or argon gas to prevent the introduction of water into the reaction vessel.

After the addition of the reagent is complete, the reaction mixture is stirred for a time, with or without heating, to ensure the completion of the reaction. The reaction can be run at temperatures of 25° to 110° C. but preferably the reaction is run at reflux temperature.

The reaction mixture is cooled to room temperature and then filtered by conventional means and the solvents and other volatile materials are then removed by stripping under vacuum with or without the addition of heat. The resulting polysilanes are liquids or solids depending on the polyhalosilane starting material and the reaction conditions used.

The resulting materials are then formed into shapes such as by melt spinning and fired at elevated temperatures to yield silicon carbide ceramic materials.

Filled silicon carbide ceramic materials can be made by adding fillers and adjuvants to the polysilane before firing.

For example, fine silicon carbide, silicon nitride, oxides, silica, glass, alumina and silicates can be used as fillers in the polysilanes of this invention and when the mixture is fired, high strength ceramic articles result. Preferred are powdered silicon carbide and silicon nitrides.

Fillers and adjuvants can be milled on 3 roll mills by simply mixing the polysilanes of this invention with the fillers and making several passes on the mill. The mixture is then shaped to the desired form and then fired to prepare the silicon carbide ceramic article.

Usually, the materials of this invention, whether filled or unfilled, are heated to 1200° C. and above to ceramify them. Generally, 1600° C. is usually the hottest temperature required to convert the polysilanes to silicon carbide ceramic materials. Thus, heating the polysilanes from 1200° C. to 1600° C. will suffice to give optimum physical properties to the final ceramic product.

The following examples are given for purposes of illustration and are not intended to limit the scope of this invention.

Titration of chloride ion in these examples was carried out in a solution of toluene and isopropanol (essentially non-aqueous) using a 0.1% solution of tetrabromophenophthalein ethyl ester in methanol/toluene. Titration was carried out using 0.5 N KOH in ethanol.

Examples 1 through 4 demonstrate the reaction of methanol with a range of polychlorosilane polymers. Polymers which are liquids having a chloride content of about 43 weight percent and solids having about 11 weight percent chlorine were employed herein.

EXAMPLE 1—Preparation of the polysilane precursor

A 500 ml. round-bottomed flask equipped with a mechanical stirrer, heating mantle, thermometer, distillation head and an inert gas inlet port was purged for 15 minutes with dry argon before adding 435.4 grams of a halosilane process residue from the Direct Synthesis of halosilanes. $(C_4H_9)_4P+Cl-$(4.3 grams) was added all at once. The reaction mass was heated rapidly (35 min.) to 90° C. The solution clouded up but cleared at 90° C. whereupon volatiles distilled when the temperature reached 100° C. The temperature was raised to 150° C. at a rate which allowed the continuous distillation of volatiles. The temperature was held at 150° C. for 2 hours at which time no more volatiles came off. The resulting methylchloropolysilane (150.6 grams) residue was allowed to cool to room temperature and then 142.1 grams of dry toluene was added. This material contained approximately 38% Cl.

Fifty-two and four tenths grams of methanol dried by distillation from magnesium turnings was slowly dripped into the toluene solution of the above prepared polymer over a 2 hour period. The color of the solution went from pale yellow to water white. The reaction mass then refluxed for a period of 18 hours. The result was a clear, gel-like liquid which was not totally soluble in toluene. It was stripped to dryness using a vacuum. One Hundred twenty-four and five tenths grams of pure white, gum-like solid was obtained. The residual % Cl was 0.3 indicating that the reaction had proceeded to 99% completion.

EXAMPLE 2

A 500 ml. 3-necked round-bottomed flask was equipped as in Example 1 above. The flask was charged with 432.5 grams of direct process residue from the Direct Synthesis of silanes which was yellowish in color. Tetrabutylphosphonium chloride was added and the solution turned water white. The reaction mixture was heated slowly to 90° C. and held until the solution cleared. The temperature was raised to 200° C. and held for 1 hour while monomeric silanes were distilled from the reaction mixture. Three hundred sixty-seven grams of monomer silane distillate was recovered. An equal weight of dry toluene was added to the remaining distillation residue. The residue was titrated for chlorine content and found to contain about 18.0 percent. Eleven and four tenths grams of methanol was added to the residue and the mixture was refluxed for 24 hours. The percent chlorine was determined by titration and was found to be 5.41%. The % reaction was 69.6%.

EXAMPLE 3

Four hundred grams of direct process residue from the direct synthesis of silanes and 4.2 grams of tetrabutylphosphonium chloride were placed into a 500 ml, 3-necked, round bottomed, glass flask and the mixture was heated with stirring. The reaction mass was heated rapidly to 250° C. and was held there for one hour while monomeric silanes were distilled away from the reaction mass. There was collected 348.7 grams of distillates. The residue in the flask was titrated for hydrolyzable chlorine and was found to have 13.1% chlorine. A 50 weight percent solution of the chlorine-containing residue was made by using dry toluene. To this solution, which was contained in a 500 ml, 3-necked flask under an argon blanket, was added 6.5 grams of methanol (5% excess over the chlorine stoichiometric quantity) was added to the dry solution via an addition funnel. After the addition of the methanol was made, the reaction mixture was heated to reflux temperature for about 18 hours and then cooled to room temperature. It was then evaporated to dryness. The yield of the methoxy derivative of the starting polymer was 96.3% and % reaction was 67.2.

EXAMPLE 4

In order to demonstrate that the alkoxy derivization of the polyhalosilanes can be effectively carried out over the range of polymers claimed in this invention, the alkoxylation of a polyhalosilane containing low quantities of hydrolyzable chlorine was carried out.

A polychlorosilane was prepared essentially as set forth in Example 3 above except that the reaction involving the formation of the polychlorosilane was carried out at 275° C. After work-up, the polychlorosilane contained about 11.0 weight percent hydrolyzable chlorine.

The alkoxylation was carried out essentially as in Example 3. Six and six tenths grams of dry methanol were rapidly added to 66.7 grams of the above prepared polymer in 50 weight percent dry toluene. Upon addition of the methanol, the reaction mass turned milky white, then cleared. The reaction mass was refluxed for about 18 hours and then cooled to room temperature. It was then evaporated to dryness to give 60.5 grams of pale yellow polymer solids. % reaction was 47.7. Gel permeation chromatography showed $M_n$ of 632; $M_w$ of 1590 and $M_w/M_n$ of 2.52. $^1$H-NMR showed a ratio of $CH_3O$:$CH_3Si$ of 0.08:1. Infra-red analysis shows the existence of —$SiOCH_3$.

EXAMPLE 5

Another chlorine containing precursor was prepared using the apparatus and methods of Example 3. Four hundred grams of direct process residue was used along with 4.0 grams of tetrabutylphosphonium chloride catalyst. The temperature was raised to 125° C. and after 15 minutes the temperature was raised to 200° C. and after 15 minutes the temperature was raised to 250° C. and held for ½ hour. Distillate was collected during this heating period. Three hundred thirty nine grams of distillate was recovered. A sample of the residue was titrated for hydrolyzable chlorine and was found to contain 15.9 weight percent. Toluene (dry) was added to the residue to make up a 50 weight percent solution.

Into a 500 ml, 3-necked round bottomed flask was placed the toluene solution described above. The flask was equipped with a reflux condenser and an addition funnel. The toluene solution was ice-cooled and 30.24 grams of methyl orthoformate was added slowly from the addition funnel. After the addition was complete, the ice bath was removed and replaced by a heating mantle and the solution was heated to gentle reflux. After 1½ hours, the heating was terminated and the solution was cooled. The volatiles were then removed by strip distillation. The newly obtained polymer contained 1.2 weight percent residual chlorine. The reaction proceeded to give a 92.4% conversion of the chlorine to methoxy. Infra red confirms the presence of Si—$OCH_3$ and a small amount of SiCl. Gel permeation chromatography showed a $M_n$ of 419, $M_w$ of 658; $M_n/M_w$ of 1.57 and $^1$H-NMR showed a mole ratio of 1:0.1:.02 for $CH_3Si$:$CH_3O$:toluene.

EXAMPLE 6

Direct process residue (426.3 grams) was treated with 4.3 grams of tetrabutylphosphonium chloride in an apparatus similar to that set forth in Example 3. The heating times and rate were the same as in Example 2. Three hundred fifty nine grams of distillate was recovered. The residue from the distillation was diluted to 50 weight percent solids with dry toluene. The weight percent hydrolyzable chlorine was found to be 18% by way of titration.

To the 50 weight percent solution described above, 16.8 grams of ethanol was added by way of dripping from an addition funnel. The solution was heated to a gentle reflux after the end of the addition of the ethanol and held there for about 65 hours. The solution was then cooled and evaporated to dryness. The resulting product was a pale yellow solid which contained 6.46 weight percent residual chlorine for a percent reaction of approximately 64%. The yield of new polymer was 92%.

EXAMPLE 7

A chlorine containing precursor polymer was prepared essentially as in Example 3. The reaction temperature was 250° C. for 1 hour. Distillate (345 grams) was obtained. The residue from the distillation contained 11.3 weight percent hydrolyzable chlorine. The polymer was dissolved in dry toluene to give a 50 weight percent solution. Ethanol (9.6 grams) was added directly to the solution of polymer. The mixture was refluxed for 13 hours and then allowed to cool to room temperature. The solution was evaporated to dryness. Residual chlorine content was 5.14 weight percent as found by titration. % yield of polymer was 86.7 weight percent. % of reaction was 54.9%. $^1$H-NMR showed a mole ratio of $SiCH_3$:$SiOCH_2CH_3$ of 1:0.08. Gel permeation chromatography showed an $M_n$ of 473; $M_w$ of 758 and $M_w/M_n$ of 1.60. Infra red spectrum showed the presence of $SiOCH_2CH_3$ and a small amount of SiCl.

EXAMPLE 8

A chlorine containing polymer was prepared as in Example 7. Heating temperature was 250° C. for 1 hr. Distillate (347.9 grams) was recovered. The hydrolyzable chlorine content on the residue was 13.0%. The material was dissolved in dry toluene to give a 50 weight percent solution. This solution was reacted with 12.4 grams of dry isopropyl alcohol by way of addition through a dropping funnel over a 15 minute period. The solution was brought to a gentle reflux for about 24 hours. The solution was then cooled and evaporated to dryness. The dry material was titrated for hydrolyzable chlorine and found to have 5.63 weight percent. Calculated yield was 97.0% % reaction was 56.9. 'H-NMR showed a mole ratio of 1:0.16 for

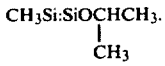

Infra red spectrum showed the presence of

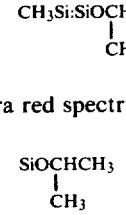

and a small amount of SiCl. Gel permeation chromatography showed an $M_n$ of 370; $M_w$ of 595 and an $M_w/M_n$ of 1.61.

EXAMPLE 9

A polychlorosilane containing 11.2 weight percent hydrolyzable chlorine was prepared similar to the method found in Example 8. This material was diluted with dry toluene to 50 weight percent solids. To this solution was added 20.4 grams of dry phenol and the reaction mixture was brought to a gentle reflux for 18 hours. The material was cooled and filtered to remove a small amount of white precipitate. The solution was evaporated to dryness and the residual chlorine content was found by titration to be 3.07 weight percent. The percent reaction was 72.6 and 99.6% of treated polymer was recovered. 'H-NMR showed a ratio of

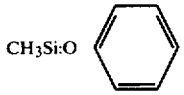

of 1:0.21. Infra red showed the presence of

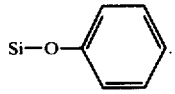

Gel permeation chromatography showed an $M_n$ of 353; $M_w$ of 4030 and an $M_w/M_n$ of 11.4.

EXAMPLE 10-Preparation of a chlorine containing polychlorosilane precursor polymer.

Direct process residue (861.3 grams) was mixed with 8.6 grams of tetrabutylphosphonium chloride in a 1 liter, 3-necked round bottomed, glass flask under an argon blanket. The flask was heated over a four hour period at 250° C. while collecting distillate. It was held for 1 hour at 250° C. This material contained about 11.0% hydrolyzable chlorine when titrated.

Table I shows a summary of reaction conditions and results for the preparation of the chlorine containing precursors of Example 1-10.

Table II shows a summary of the reaction conditions and results for the preparation of the inventive derivatives of Examples 1-9.

Table III shows the results of pyrolyzing the new polymers from the examples to silicon carbide ceramic materials.

Materials were fired in a series 1000A water cooled graphite heated model 1000.3060-FP-12 Astro Industries furnace under an argon atmosphere generally at heating rates of 300°/hr to 300° C., 200° C./hr. to 500° C., 100° C./hr to 700° C., and then 300°/hr to 1000° C. and finally as rapidly as possible to 2000° C. (usually 8 hours more).

TABLE I

Summary of reaction conditions for preparation of chlorine containing precursor polymers

| Example # | Reaction temp./°C. | Time/hrs. | Titrated % Cl |
|---|---|---|---|
| 1 | 150 | 2 | 38.0 |
| 2 | 200 | 1 | 18.0 |
| 3 | 250 | 1 | 13.1 |
| 4 | 275 | 1 | 11.0 |
| 5 | 250 | ½ | 15.9 |
| 6 | 200 | 1 | 18.0 |
| 7 | 250 | 1 | 11.3 |
| 8 | 250 | 1 | 13.0 |
| 9 | 250 | 1 | 11.2 |
| 10 | 250 | 1 | 11.0 |

TABLE II

Summary of the reaction conditions for preparation of the derivatives of the chlorine containing precursor polymers

| Example # | Solvent | Reaction temp./°C. | Time/hrs. | Type of Derivatives |
|---|---|---|---|---|
| 1 | toluene | reflux | 18 | $-OCH_3$ |
| 2 | " | " | 24 | $-OCH_3$ |
| 3 | " | " | 18 | $-OCH_3$ |
| 4 | " | " | 18 | $-OCH_3$ |
| 5 | " | " | 1½ | $-OCH_3$ |
| 6 | " | " | 65 | $-OCH_2CH_3$ |
| 7 | " | " | 13 | $-OCH_2CH_3$ |
| 8 | " | " | 24 | $-OCH(CH_3)_2$ |
| 9 | " | " | 18 | $-O$ 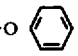 |

TABLE III

Properties of Fired samples from the Examples 1-10

| Example # | Fired at 1200° C. % wt retention | Fired at 1200° C. Grain size A | Fired at 1600° C. % wt retention | Fired at 1600° C. Grain size Å |
|---|---|---|---|---|
| 1 | 51.7 | 30 | — | — |
| 2 | 70.0 | 30 | 55.1 | 118 ± 25 |
| 3 | 65.8 | 30 | 53.1 | 116 ± 30 |
| 4 | 65.1 | 30 | 51.7 | 166 ± 30 |
| 5 | 72.6 | 30 | 63.3 | 139 ± 30 |
| 6 | 62.9 | 30 | 47.0 | 171 ± 30 |
| 7 | 54.8 | 40 | 51.0 | 215 ± 25 |
| 8 | 54.6 | 30 | 48.5 | 58 ± 20 |
| 9 | 53.2 | 30 | 43.7 | 220 ± 40 |
| 10 | 58.0 | — | 50.4 | — |

That which is claimed is:

[1. A method of preparing a polysilane having the average formula $$\{(CH_3)_2Si\}\{CH_3Si\} \quad (I)$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 25 weight percent chlorine or 0–35 weight percent bromine, all based on the weight of the polysilane which method consists of (A) reacting under anhydrous conditions a polysilane having the average unit formula $$\{(CH_3)_2Si\}\{CH_3Si\} \quad \text{(II)}$$

in which there is from 0 to 60 mole percent $(CH_3)_2Si{=}$ units and 40 to 100 mole percent $CH_3Si{\equiv}$ units, wherein the remaining bonds on the silicon atoms are attached to either another silicon atom, a chlorine atom or a bromine atom such that the polysilane contains from 10–43 weight percent, based on the weight of the polysilane, of hydrolyzable chlorine or 21–61 weight percent based on the weight of the polysilane of hydrolyzable bromine, with a reagent selected from the group consisting of (i) carbinols having the general formula ROH (ii) alcoholates having the general formula ROM and (iii) alkyl orthoformates having the general formula $(R'O)_3CH$ wherein R is the same as above, R′ is an alkyl group of 1–4 carbon atoms, and M is sodium, potassium or lithium, at a temperature of from 0° to 110° C. for a period of from 1.5 to 65 hours, in a suitable solvent, and (B) thereafter recovering the polysilane (I).]

2. A method of preparing a polysilane as claimed in claim [1] *14* wherein there is present at least a stoichiometric quantity of a carbinol based on the amount of halogen in the polysilane (II).

3. A method of preparing a polysilane as claimed in claim [1] *14* wherein there is present at least a stoichiometric quantity of an alcoholate based on the amount of halogen in the polysilane (II).

4. A method of preparing a polysilane as claimed in claim [1] *14* wherein there is present at least a stoichiometric quantity of an alkyl orthoformate based on the amount of halogen in the polysilane (II).

[5. A composition of matter consisting essentially of a polysilane having the average unit formula $$\{(CH_3)_2Si\}\{CH_3Si\}$$

in which polysilane there is from 0 to 60 mole percent $(CH_3)_2Si{=}$ units and 40 to 100 mole percent $CH_3Si{\equiv}$ units, wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane.]

[6. A method of preparing silicon carbide ceramic materials which consists of heating a polysilane having the average unit formula $$\{(CH_3)_2Si\}\{CH_3Si\}$$

in which polysilane there is from 0 to 60 mole percent $(CH_3)_2Si{=}$ units and 40 to 100 mole percent $CH_3Si{\equiv}$ units wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 25 weight percent chlorine or 0–35 weight percent bromine, all based on the weight of the polysilane.]

7. Silicon carbide ceramic material prepared by the method as claimed in claim [6] *16*.

8. A method of preparing a silicon carbide-containing ceramic article which consists of (A) forming an article of the desired shape from a polysilane having the average formula $$\{(CH_3)_2Si\}\{CH_3Si\}$$

in which polysilane there is from 0 to 60 mole percent $(CH_3)_2Si{=}$ units and 40 to 100 mole percent $CH_3Si{\equiv}$ units, wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane; and (B) heating the article formed in (A) in an inert atmosphere or in a vacuum to an elevated temperature in the range of 1200° C. to 1600° C. until the polysilane is converted to a silicon carbide-containing ceramic article.

9. The silicon carbide-containing ceramic article prepared by the method of claim [8] *17*.

10. A method of preparing a filled silicon carbide-containing ceramic article which consists of (A) mixing a polysilane with at least one conventional ceramic filler which polysilane has the average formula $$\{(CH_3)_2Si\}\{CH_3Si\}$$

in which polysilane there is from 0 to 60 mole percent $(CH_3)_2Si{=}$ units and 40 to 100 mole percent $CH_3Si{\equiv}$ units, wherein there is also bonded to the silicon atoms other silicon atoms and radicals having the formula

RO— wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane, (B) forming an article of the desired shape from the mixture of polysilane and fillers and, (C) heating the article formed in (B) in an inert atmosphere or in a vacuum to an elevated temperature in the range of 1200° C. to 1600° C. until the polysilane is converted to a silicon carbide-containing ceramic.

11. An article prepared by the method of claim [10] *17.*

12. A method of preparing an article coated with ceramic which consists of (A) mixing a polysilane with at least one conventional ceramic filler which polysilane has the average unit formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula $$RO—$$

wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 35 percent chlorine or 0–35 weight percent bromine, all based on the weight of the polysilane;

(B) coating a substrate with the mixture of polysilane and fillers and, (C) heating the coated substrate in an inert atmosphere or in a vacuum to an elevated temperature in the range of 1200° C. to 1600° C. until the coating is converted to a silicon carbide ceramic, whereby a silicon carbide-containing ceramic coated article is obtained.

13. An article prepared by the method of claim [12] *19.*

*14. A method of preparing a solid polysilane having the average formula*

$$\{(CH_3)_2Si\}\{CH_3Si\} \quad (I)$$

*in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula*

$$RO—$$

*wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 25 weight percent chlorine or 0–35 weight percent bromine, all based on the weight of the polysilane which method consists of*

*(A) reacting under anhydrous conditions a polysilane having the average unit formula*

$$\{(CH_3)_2Si\}\{CH_3Si\} \quad (II)$$

*in which there is from 0 to 60 mole percent $(CH_3)_2Si=$ units and 40 to 100 mole percent $CH_3Si\equiv$ units, wherein the remaining bonds on the silicon atoms are attached to either another silicon atom, a chlorine atom or a bromine atom such that the polysilane contains from 10–43 weight percent, based on the weight of the polysilane, of hydrolyzable chlorine or 21–62 weight percent based on the weight of the polysilane of hydrolyzable bromine, with a reagent selected from the group consisting of*

*(i) carbinols having the general formula ROH*

*(ii) alcoholates having the general formula ROM and*

*(iii) alkyl orthoformates having the general formula $(R'O)_3CH$ wherein R is the same as above, R' is an alkyl group of 1–4 carbon atoms, and M is sodium, potassium or lithium, at a temperature of from 0° to 110° C. for a period of from 1.5 to 65 hours, in a suitable solvent, and*

*(B) thereafter recovering the polysilane (I).*

*15. A composition of matter consisting essentially of a solid polysilane having the average unit formula*

$$\{(CH_3)_2Si\}\{CH_3Si\}$$

*in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula*

$$RO—$$

*wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane.*

*16. A method of preparing silicon carbide ceramic materials which consists of heating a solid polysilane having the average unit formula*

$$\{(CH_3)_2Si\}\{CH_3Si\}$$

*in which polysilane there is from 0 to 60 mole percent $(CH_3)_2Si=$ units and 40 to 100 mole percent $CH_3Si\equiv$ units wherein there is also bonded to the silicon atoms other silicon atoms and radicals having the formula*

$$RO—$$

*wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical and either 0 to 25 weight percent chlorine or 0–35 weight percent bromine, all based on the weight of the polysilane.*

*17. A method of preparing a silicon carbide-containing ceramic article which consists of*

(A) forming an article of the desired shape from a solid polysilane having the average formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula $$RO-$$

wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane; and (B) heating the article formed in (A) in an inert atmosphere or in a vacuum to an elevated temperature in the range of 1200° C. to 1600° C. until the polysilane is converted to a silicon carbide-containing ceramic article.

18. A method of preparing a filled silicon carbide-containing ceramic article which consists of (A) mixing a solid polysilane with at least one conventional ceramic filler which polysilane has the average formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula $$RO-$$

wherein R is an alkyl radical of 1 to 4 carbon atoms or phenyl wherein essentially all the remaining bonds on silicon are attached to chlorine or bromine atoms such that the polysilane contains from 24 to 61 weight percent of RO— when R is an alkyl radical, 26 to 66 weight percent of RO— when R is a phenyl radical, and either 0 to 25 weight percent chlorine or 0–35 weight percent bromine, all based on the weight of the polysilane, (B) forming an article of the desired shape from the mixture of polysilane and fillers and, (C) heating the article formed in (B) in an inert atmosphere or in a vacuum to an elevated temperature in the range of 1200° C. to 1600° C. until the polysilane is converted to a silicon carbide-containing ceramic.

19. A method of preparing an article coated with ceramic which consists of (A) mixing a solid polysilane with at least one conventional ceramic filler which polysilane has the average unit formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula $$RO-$$

wherein R is an alkyl radical of 1 to 4 carbon atoms or phenyl wherein essentially all the remaining bonds on silicon are attached to chlorine or bromine atoms such that the polysilane contains from 24 to 61 weight percent or RO— when R is an alkyl radical, 26 to 66 weight percent of RO— when R is a phenyl radical, and either 0 to 35 weight percent chlorine or 0–35 weight percent bromine, all based on the weight of the polysilane, (B) coating a substrate with the mixture of polysilane and fillers and, (C) heating the coated substrate in an inert atmosphere or in a vacuum to an elevated temperature in the range of 1200° C. to 1600° C. until the coating is converted to a silicon carbide ceramic, whereby a silicon carbide-containing ceramic coated article is obtained.

* * * * *